3,282,640
ISOCYANATE AND β-PROPIOLACTONE TREATMENT OF WOOL
Nathan H. Koenig, Berkeley, and Rosa A. Crass, Oakland, Calif., assignors to the United States of America as represented by the Secretary of Agriculture
No Drawing. Filed Aug. 2, 1963, Ser. No. 299,674
8 Claims. (Cl. 8—128)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool. In particular, the invention concerns and has as its prime object the provision of novel processes wherein wool is chemically modified by reacting it with a mixture of an organic isocyanate and β-propiolactone. Further objects of the invention will be apparent from the following description wherein parts and percentages are by weight unless otherwise specified.

Although wool is a very useful fiber it is often desirable to improve its properties for particular applications by chemically modifying it. Various compounds have been proposed for reaction with wool to produce modified fibers. It is known, for example, that wool can be chemically modified by reacting it with an isocyanate. It is also known that wool can be chemically modified by reacting it with β-propiolactone.

It has now been found that when wool is reacted with a mixture containing both an isocyanate and β-propiolactone, superior results are attained as compared with the reaction of wool with the individual compounds. A primary advantage of the process of the invention is that it yields an unexpectedly high degree of modification of the wool. This unusual result of the invention is demonstrated by the following comparative experiments:

EXAMPLE I

(a) Reaction of wool with a mixture of isocyanate and β-propiolactone

Dry wool cloth (1.2 g.), o-chlorophenyl isocyanate (5 ml.), and β-propiolactone (153 mg.) were heated at 95° C. for 3 hours. To remove unreacted reagents, the treated wool was washed in warm acetone while applying a rubbing action, then extracted with ethanol overnight in a Soxhlet apparatus. After the cloth was dried it was found that the increase in the weight of the wool, due to its combination with the isocyanate and β-propiolactone, was 25%.

(b) Reaction of wool with isocyanate

Dry wool cloth (1.2 g.) and o-chlorophenyl isocyanate (5 ml.) were heated at 95° C. for 3 hours. The wool was extracted as described in part (a) and dried. It was found that the increase in weight of the wool was 7%.

(c) Reaction of wool with β-propiolactone

β-Propiolactone (159 mg.) was distributed with a capillary dropper on dry wool cloth (1.2 g.) and the sample was heated at 95° C. for 3 hours. The wool was extracted as described in part (a) and dried. The increase in the weight of the wool was 7%.

The above results are summarized below:

| Run | Reagents used | | Increase in weight of wool, percent |
|---|---|---|---|
| | Isocyanate | β-Propiolactone | |
| a | Yse | Yes | 25 |
| b | Yes | No | 7 |
| c | No | Yes | 7 |

It is evident from the above data that the process of the invention achieves a degree of modification which is far greater than the expected additive effect. In other words, by employing a mixture containing both the isocyanate and β-propiolactone, we obtain a synergistic effect. Since the process of the invention yields wools of an enhanced degree of modification as compared with those prepared under comparable conditions with an isocyanate or β-propiolactone alone, it has the practical advantage of yielding products which exhibit greater resistance to deleterious agents or influences, such as bleaching agents, acidic conditions, laundering media, etc.

Carrying out the process of the invention essentially involves contacting wool with a mixture of the isocyanate and β-propiolactone. The reaction conditions such as proportion of reagents, specific isocyanate used, time, temperature, etc. are not critical and may be varied to suit individual circumstances without changing the basic nature of the invention. The mixture of isocyanate and β-propiolactone is generally selected to contain from 5 to 95% of isocyanate and the remainder (95 to 5%) of β-propiolactone. The temperature of reaction may be from 35 to 125° C. A preferred range to expedite the reaction, yet without damaging the wool is 95 to 115° C. In the preferred embodiment of the invention, the amount of β-propiolactone used is limited to not more than 50%, based on the weight of wool being treated, whereby avoiding any degradation of the wool. Since both isocyanates and β-propiolactone react readily with water, it is desirable to carry out the reaction under anhydrous conditions, thereby to ensure reaction of the wool with the modifying agents. The reaction can be applied to wool in its normal undried condition (containing about 12 to 14% water) but in such case, the reaction between the wool and the modifying agents will be accompanied by formation of difficultly removable by-products. The degree of modification of the wool is influenced by the proportion of modifying agents taken up by the fiber; that is, the higher the uptake of isocyanate and β-propiolactone, the greater will be the degree of modification of the wool. In general, the uptake of isocyanate and β-propiolactone may be varied from 1 to 90%. In conducting the reaction the isocyanate is generally employed in excess over the amount desired to be taken up by the fibers. The time of reaction will vary depending on such factors as the proportion of modifying agents, temperature of reaction, reactivity of the isocyanate selected, and the degree of modification desired. In general, the reaction may take anywhere from a few minutes to several hours. The reaction may be conducted in the presence of conventional inert diluents or solvents such as dichloromethane, 1,2-dichloropropane, petroleum ether, toluene, or the like.

After reaction of the wool with the mixture of isocyanate and β-propiolactone, the chemically modified wool is treated to remove excess reagents and solvent, if such is used. Thus the wool may be treated as by wringing, passage through squeeze rolls, centrifugation, or the like. In place of such mechanical action, or in addition thereto, the modified wool product may be extracted with a solvent such as trichloroethylene, benzene, acetone, ethanol, carbon tetrachloride, etc. Successive extractions with different solvent may be applied to ensure complete removal of all unreacted materials. The treated wool is then dried in the usual way.

Wool modified in accordance with the invention exhibits advantageous properties over normal wool. For example, the modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. The increased resistance to oxidizing conditions has been shown by exposing normal and modified wool samples to solutions of sodium hypochlorite, which is used in commercial bleaches.

The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergents and water formulations.

Although the properties of the modified wool indicate beyond question that actual chemical combination between the isocyanate and $\beta$-propiolactone has taken place, it is not known for certain how these chemicals are united with wool. It is believed, however, that the isocyanate and $\beta$-propiolactone react with the sites in the wool molecule where there are reactive hydrogen atoms—these include such groups as amino, hydroxyl, thiol, phenolic, amide, guanidino, imidazoyl, and carboxyl. It may be, however, that other reactions occur and we do not intend to limit the invention to any theoretical basis. It is to be noted that the reaction in accordance with the invention does not impair the wool fiber for its intended purpose, that is, for producing woven or knitted textiles, garments, etc.

The process of the invention may be applied to wool in the form of fibers, as such, or in the form of threads, yarns, slivers, knitted or woven goods, felts, etc. The wool textiles may be white or dyed goods and may be of all-wool composition or blends of wool with other textile fibers such as cotton, regenerated cellulose, viscose, animal hair, etc.

The process of the invention is not restricted to any particular isocyanate or class of isocyanates. Consequently, the invention may be applied in the reaction of wool with a mixture of $\beta$-propiolactone and any type of organic isocyanate. Particularly preferred are the aliphatic, aromatic, or aromatic-aliphatic compounds containing one or more isocyanate groups. These compounds may be hydrocarbon isocyanates or may contain substitutents on the hydrocarbon residue, such as halogen (chlorine, bromine, iodine, and fluorine), ether groups, ester groups, nitro groups, etc. Examples of compounds coming into the purview of the invention are listed below by way of illustration and not limitation:

Typical examples of compounds in the category of aliphatic isocyanates are methyl isocyanate, ethyl isocyanate, propyl isocyanate, isopropyl isocyanate, butyl (normal, iso, secondary, or tertiary) isocyanate, amyl isocyanate, isoamyl isocyanate, hexyl isocyanate, octyl isocyanate, 2-ethylhexyl isocyanate, decyl isocyanate, dodecyl isocyanate, tetradecyl isocyanate, hexadecyl isocyanate, octadecyl isocyanate, oleyl isocyanate, allyl isocyanate, crotyl isocyanate, cyclohexyl isocyanate, methylcyclohexyl isocyanate, 2-chloroethyl isocyanate, 2-bromoethyl isocyanate, 2-iodoethyl isocyanate, 2-fluoroethyl isocyanate, 12-chlorododecyl isocyanate, 4-chlorocyclohexyl isocyanate, 2-methoxyethyl isocyanate, 2-ethoxyethyl isocyanate 2-butoxyethyl isocyanate, carbethoxymethyl isocyanate, ethylene diisocyanate, propylene diisocyanate, butylene diisocyanate, trimethylene diisocyanate, tetramethylene diisocyanate, hexamethylene diisocyanate, octamethylene diisocyanate, decamethylene diisocyanate, cyclohexylene diisocyanate, bis (2-isocyanatoethyl) ether, bis (2-isocyanatoethyl)ether of ethylene glycol, 1-chloropropane-2,2-diisocyanate, etc.

Typical examples of compounds in the category of aromatic isocyanates are phenyl isocyanate, o-tolyl isocyanate, m-tolyl isocyanate, p-tolyl isocyanate, xylyl isocyanate, alpha-naphthyl isocyanate, dodecylphenyl isocyanate, cyclohexylphenyl isocyanate, biphenylyl isocyanate, benzylphenyl isocyanate, o-chlorophenyl isocyanate, m-chlorophenyl isocyanate, p-chlorophenyl isocyanate, 2,5-dichlorophenyl isocyanate, m-bromophenyl isocyanate, o-methoxyphenyl isocyanate, p-bromophenyl isocyanate, p-methoxyphenyl isocyanate, o-ethoxyphenyl isocyanate, p-ethoxyphenyl isocyanate, m-nitrophenyl isocyanate, p-nitrophenyl isocyanate, o-phenylene diisocyanate, m-phenylene diisocyanate, p-phenylene diisocyanate, tolylene-2,4-diisocyanate, tolylene-2,6-diisocyanate, 3,3'-bitolylene-4,4'-diisocyanate, 3,5,3',5'-bixylylene-4,4'-diisocyanate, diphenylmethane - 4,4' - diisocyanate, biphenylene - 4,4'-diisocyanate, 3',3'-dimethoxybiphenylene-4,4'-diisocyanate, naphthalene diisocyanates, polymethylene polyphenyl isocyanates, etc.

Typical examples of aromatic-aliphatic isocyanates are benzyl isocyanate, chlorobenzyl isocyanates, methylbenzyl isocyanates, methoxybenzyl isocyanates, nitrobenzyl isocyanates, 2-phenoxyethyl isocyanate, 2-benzoxyethyl isocyanate, etc.

The invention is further demonstrated by the following examples:

EXAMPLE II

A sample of the product of Example I, part ($a$)—made by reacting wool with o-chlorophenyl isocyanate and $\beta$-propiolactone—was tested to determine its resistance to hypochlorite. For comparison purposes, the same test was applied to the untreated wool and to the wools modified as disclosed in Example I, parts ($b$) and ($c$), these latter representing wool treated solely with o-chlorophenyl isocyanate or solely with $\beta$-propiolactone.

The hypochlorite resistance test was performed as follows:

A 2-cm. length of yarn was removed from the fabric and placed in a 50-ml. beaker containing 20 ml. of 3% aqueous sodium hypochlorite. The liquid was stirred magnetically until the yarn had dissolved and the elapsed time was noted.

The results tabulated below show the increased resistance to sodium hypochlorite of wool modified in accordance with the invention.

| Reagents used in modifying wool: | Time to dissolve yarn, min. |
|---|---|
| o-Chlorophenyl isocyanate and $\beta$-propiolactone (Ex. I, ($a$)) | 45 |
| o-Chlorophenyl isocyanate (Ex. I, ($b$)) | 7 |
| $\beta$-Propiolactone (Ex. I, ($c$)) | 3 |
| None (untreated wool) | 3 |

EXAMPLE III

A 1.2-gram sample of dry wool was heated with 5 ml. of phenyl isocyanate and 155 mg. of $\beta$-propiolactone for 3 hours at 95° C. The treated wool was extracted as in Example I, part ($a$), and dried. The increase in the weight of the wool was 23%. A sample of the product was then tested for shrinkage according to the procedure of Example VIII. The area shrinkage in this test was 1%.

EXAMPLE IV

A 1.2-gram sample of dry wool cloth was heated with 5 ml. of phenyl isocyanate and 108 mg. of $\beta$-propiolactone for 6 hours at 95° C. The treated wool was extracted as in Example I, part (a), and dried. The increase in weight of the wool was 36%. A yarn was removed from the sample and the sodium hypochlorite resistance test run according to the procedure in Example II. The time required to dissolve the yarn was 190 minutes.

EXAMPLE V

A 1.2-gram sample of dry wool cloth was heated with 5 ml. of naphthyl isocyanate and 151 mg. of β-propiolactone for three hours at 95° C. The treated wool was extracted as in Example I, part (a), and dried. The increase in the weight of the wool was 16%. A yarn was removed from the sample and the sodium hypochlorite resistance test run according to the procedure in Example II. The yarn was still intact after thirty minutes when the test was discontinued. The remaining fabric was then tested for shrinkage according to the procedure of Example VIII. The area shrinkage was found to be 0%.

EXAMPLE VI

Dry wool _____ g__ 1.2
Phenyl isocyanate _____ ml__ 1
β-Propiolactone _____ ml__ 0.5
Dichloromethane _____ ml__ 4

The above materials were put into a covered, but unsealed, Petri dish which was then placed in an oven at 105° C. for 30 minutes (during which period the dichloromethane vaporized). The treated wool was extracted as in Example I, part (a), and dried. The increase in the weight of the wool was 42%.

A sample of the above product was tested for hypochlorite resistance according to the procedure of Example II. The yarn was still intact when the test was discontinued after 90 minutes.

EXAMPLE VII

Dry Wool _____ g__ 1.2
Toluene-2,4-diisocyanate _____ ml__ 1
β-Propiolactone _____ ml__ 0.5
Dichloromethane _____ ml__ 4

The above materials were put into a covered, but unsealed, Petri dish which was then placed in an oven at 105° C. for 45 minutes (during which period the dichloromethane vaporized). The treated wool was extracted as in Example I, part (a), and dried. The increase in the weight of the wool was 43%.

In the copending application of Nathan H. Koenig, Serial No. 171,535, filed February 6, 1962, now Patent No. 3,112,157, there is disclosed and claimed a process for modifying wool by reacting it with an organic isocyanate in the presence of γ-butyrolactone. It might appear at first glance that little difference is involved in situations involving reaction of wool with (1) an isocyanate plus γ-butyrolactone or with (2) an isocyanate plus β-propiolactone. Actually, however, important distinctions are involved. In the first place, γ-butyrolactone is a stable, relatively-unreactive compound because of the presence of the stable 5-member heterocyclic ring; β-propiolactone, on the other hand, is extremely reactive because of the presence of the unstable 4-member heterocyclic configuration. In the second place, γ-butyrolactone does not itself react to any material extent with wool. When it is used in conjunction with an isocyanate, it promotes reaction of wool with the isocyanate without itself reacting with the wool. On the other hand, β-propiolactone does react with wool and by appropriate selection of conditions, modified wools containing substantial proportions, even over 100%, of chemically-combined β-propiolactone can be prepared as shown in the following U.S. patents: Lundgren et al., 2,517,573 and 2,672,397, and Rose et al., 2,717,194. Moreover, when wool is reacted with an isocyanate and β-propiolactone, both of these compounds chemically combine with the wool so that the product has entirely different properties than it would if reacted with an isocyanate in the presence of γ-butyrolactone as a reaction promoter. The distinction between the two lactones is further demonstrated by the following example:

EXAMPLE VIII (a) A 1.2-gram sample of dry wool was heated with 5 ml. of o-chlorophenyl isocyanate and 0.2 gram of β-propiolactone for 30 minutes at 95° C.

(b) Another 1.2-gram sample of dry wool was heated with 5 ml. of o-chlorophenyl isocyanate and 0.2 gram of γ-butyrolactone for 30 minutes at 95° C.

Both treated wool samples were extracted as in Example I, part (a), and dried. A sample of each product was tested to determine its shrinkage characteristics. For purposes of comparison, the same test was applied to untreated wool and to wool which had been reacted with β-propiolactone alone as described in Example I, part (c).

The shrinkage test was carried out as follows: The wool samples were violently agitated in an Accelerotor at 1700 r.p.m. for 6 minutes at 40–42° C. with 0.9% sodium oleate solution, using a liquor-to-wool ratio of 50:1. The area of the samples was measured before and after this laundering process.

The weight increases of the wool samples after treatment and their shrinkage properties are tabulated below:

| Reagents used in modifying wool | Increase in weight of wool, percent | Area shrinkage, percent |
|---|---|---|
| o-Chlorophenyl isocyanate and β-propiolactone | 11 | 1 |
| o-Chlorophenyl isocyanate and γ-butyrolactone | 2 | 44 |
| β-Propiolactone (Ex. I, Pt. c) | 7 | 41 |
| None (untreated wool) | 0 | 50 |

Having thus described the invention, what is claimed is:

1. A process for chemically modifying wool which comprises reacting wool under anhydrous conditions with a mixture containing 5 to 95% by weight of β-propiolactone and 95 to 5% by weight of an organic isocyanate selected from the group consisting of aliphatic, aromatic, and aromatic-aliphatic isocyanates.

2. The process of claim 1 wherein the organic isocyanate is an aromatic isocyanate.

3. The process of claim 1 wherein the organic isocyanate is phenyl isocyanate.

4. The process of claim 1 wherein the organic isocyanate is chlorophenyl isocyanate.

5. The process of claim 1 wherein the organic isocyanate is bromophenyl isocyanate.

6. The process of claim 1 wherein the organic isocyanate is toluene diisocyanate.

7. The process of claim 1 wherein the organic isocyanate is an aliphatic isocyanate.

8. The process of claim 1 wherein the organic isocyanate is an aromatic-aliphatic isocyanate.

References Cited by the Examiner

UNITED STATES PATENTS

| 2,517,573 | 8/1950 | Jones et al. | 8—128 X |
| 2,672,397 | 3/1954 | Lungdren et al. | 8—128 X |
| 2,717,194 | 9/1955 | Rose et al. | 8—128 X |
| 2,880,054 | 3/1959 | Moore et al. | 8—127.6 |
| 3,007,763 | 11/1961 | Adams | 8—116.2 |
| 3,112,157 | 11/1963 | Koenig | 8—128 |

FOREIGN PATENTS 586,549   3/1947   Great Britain.

NORMAN G. TORCHIN, *Primary Examiner.*

J. CANNON, *Assistant Examiner.*